United States Patent
Hauk

(10) Patent No.: US 11,270,350 B2
(45) Date of Patent: Mar. 8, 2022

(54) SYSTEMS AND METHOD FOR VERIFYING VEHICLE BANNER PRODUCTION AND IMAGE ALTERATION

(71) Applicant: Sharp Cars Detailing & More, LLC, O'Fallon, MO (US)

(72) Inventor: Jason Hauk, O'Fallon, MO (US)

(73) Assignee: 3I AVI, LLC, Dallas, TX (US)

( * ) Notice: Subject to any disclaimer, the term of this patent is extended or adjusted under 35 U.S.C. 154(b) by 768 days.

(21) Appl. No.: 15/945,828

(22) Filed: Apr. 5, 2018

(65) Prior Publication Data

US 2018/0225722 A1 Aug. 9, 2018

Related U.S. Application Data

(63) Continuation-in-part of application No. 14/575,260, filed on Dec. 18, 2014, now Pat. No. 10,269,059, which is a continuation-in-part of application No. 14/574,638, filed on Dec. 18, 2014, now abandoned, which is a continuation-in-part of application No. 14/088,939, filed on Nov. 25, 2013, now abandoned, application No. 15/945,828, filed on Apr. 5, 2018, which is a continuation-in-part of application No. 15/012,033, filed on Feb. 1, 2016, now Pat. No. 10,681,261, which is a continuation-in-part of
(Continued)

(51) Int. Cl.
*G06Q 30/02* (2012.01)
*G06Q 30/00* (2012.01)
*G06F 3/12* (2006.01)
*G06T 11/60* (2006.01)

(52) U.S. Cl.
CPC ....... *G06Q 30/0273* (2013.01); *G06F 3/1204* (2013.01); *G06F 3/1243* (2013.01); *G06F 3/1293* (2013.01); *G06Q 30/00* (2013.01); *G06Q 30/0277* (2013.01); *G06T 11/60* (2013.01)

(58) Field of Classification Search
CPC ....................................... G06Q 30/0601–0645
USPC ............................................. 705/26.1–27.2
See application file for complete search history.

(56) References Cited

U.S. PATENT DOCUMENTS

| 6,809,887 B1 | 10/2004 | Gao et al. |
| 6,817,300 B2 | 11/2004 | Schwenker |
| 7,465,108 B2 | 12/2008 | Brown |
| (Continued) | | |

FOREIGN PATENT DOCUMENTS

AU    2014200204 A1    7/2015

OTHER PUBLICATIONS

Tara Siegel Bernard, "Car dealers Wince at a site to end sales haggling" New York Times 2012 (Year: 2012).*
(Continued)

*Primary Examiner* — Allison G Wood
*Assistant Examiner* — Jason B Warren
(74) *Attorney, Agent, or Firm* — Stinson LLP

(57) ABSTRACT

A computerized exchange network enables verifying vehicle banner production and image alterations, such as altering images to include indicia for example. In an embodiment, verifying successful production of a vehicle banner by a printing device enables remittance of a cooperative advertising reimbursement. In another embodiment, verifying image alterations by a computing device enables remittance of a cooperative advertising reimbursement.

6 Claims, 7 Drawing Sheets

Related U.S. Application Data application No. 14/574,638, filed on Dec. 18, 2014, now abandoned.

(60) Provisional application No. 62/484,197, filed on Apr. 11, 2017, provisional application No. 61/918,492, filed on Dec. 19, 2013, provisional application No. 61/920,576, filed on Dec. 24, 2013, provisional application No. 61/792,258, filed on Mar. 15, 2013, provisional application No. 61/732,078, filed on Nov. 30, 2012.

(56) References Cited

U.S. PATENT DOCUMENTS

| | | | |
|---|---|---|---|
| 7,631,602 | B2 | 12/2009 | Schwenker |
| 7,889,931 | B2 | 2/2011 | Webb et al. |
| 8,112,325 | B2 | 2/2012 | Foy et al. |
| 8,830,320 | B2 | 9/2014 | Swinford |
| 8,830,321 | B2 | 9/2014 | Swinford |
| 8,836,785 | B2 | 9/2014 | Swinford |
| 9,526,254 | B2 | 12/2016 | Sadler-Bridge et al. |
| 9,582,810 | B2* | 2/2017 | Wingle ............ G06Q 30/0241 |
| 2001/0053284 | A1 | 12/2001 | Shin |
| 2002/0010655 | A1 | 1/2002 | Kjallstrom |
| 2002/0026390 | A1 | 2/2002 | Ulenas et al. |
| 2002/0063714 | A1 | 5/2002 | Haas et al. |
| 2002/0135677 | A1 | 9/2002 | Noro et al. |
| 2003/0016288 | A1 | 1/2003 | Kaylor et al. |
| 2004/0183803 | A1 | 9/2004 | Longo |
| 2006/0074790 | A1 | 4/2006 | Anspach |
| 2007/0274519 | A1* | 11/2007 | Cohen ................. H04N 1/4426 380/201 |
| 2009/0160930 | A1 | 6/2009 | Ruppert |
| 2013/0208084 | A1 | 8/2013 | Brunner et al. |
| 2013/0258045 | A1 | 10/2013 | Wojciech |
| 2013/0260727 | A1* | 10/2013 | Knudson ............ H04M 1/0264 455/414.1 |
| 2014/0010412 | A1 | 1/2014 | Price |
| 2014/0279868 | A1* | 9/2014 | Astorg ................. G06Q 30/02 707/609 |
| 2015/0106195 | A1* | 4/2015 | Holman ............... G06F 21/32 705/14.46 |
| 2016/0346892 | A1 | 12/2016 | Bhapkar et al. |
| 2017/0070653 | A1 | 3/2017 | Irschick et al. |
| 2018/0330395 | A1* | 11/2018 | Lee .................... G06Q 30/0611 |

OTHER PUBLICATIONS

Lavrinc, Damon, Giant New CT Scanner Creates a 3-D Image of Your Car's Guts, http://www.wired.com/autopia/2013/10/ct-scan-car-crash/, Oct. 8, 2013, 1 page.

Nonfinal Office action from related U.S. Appl. No. 14/088,939, dated Feb. 19, 2016, 14 pages.

Final Office action from related U.S. Appl. No. 14/088,939, dated Aug. 19, 2016, 21 pages.

Nonfinal Office action from related U.S. Appl. No. 15/012,033, dated Jun. 14, 2018, 16 pages.

Nonfinal Office action from related U.S. Appl. No. 14/575,260, dated Jan. 26, 2018, 10 pages.

\* cited by examiner

SYSTEMS AND METHOD FOR VERIFYING VEHICLE BANNER PRODUCTION AND IMAGE ALTERATION

CROSS-REFERENCE TO RELATED APPLICATIONS

This application claims priority from U.S. Provisional Patent Application Ser. No. 62/484,197 filed Apr. 11, 2017, and is a continuation-in-part of U.S. patent application Ser. No. 14/575,260 filed Dec. 18, 2014, which claims priority from U.S. Provisional Patent Application Ser. No. 61/918,492 filed Dec. 19, 2013 and U.S. Provisional Patent Application Ser. No. 61/920,576 filed Dec. 24, 2013 and is a continuation-in-part of U.S. patent application Ser. No. 14/574,638 filed Dec. 18, 2014, which is a continuation-in-part of U.S. patent application Ser. No. 14/088,939 filed Nov. 25, 2013, which claims priority from U.S. Provisional Patent Application Ser. No. 61/792,258 filed Mar. 15, 2013 and U.S. Provisional Patent Application Ser. No. 61/732,078 filed Nov. 30, 2012. This application is also a continuation-in-part of U.S. patent application Ser. No. 15/012,033 filed Feb. 1, 2016, which is a continuation-in-part of U.S. patent application Ser. No. 14/574,638 filed Dec. 18, 2014, which is a continuation-in-part of U.S. patent application Ser. No. 14/088,939 filed Nov. 25, 2013, which claims priority from U.S. Provisional Patent Application Ser. No. 61/792,258 filed Mar. 15, 2013 and U.S. Provisional Patent Application Ser. No. 61/732,078 filed Nov. 30, 2012. The entire contents of the above-identified applications are expressly incorporated herein by reference, including the contents and teachings of any references contained therein.

BACKGROUND

Vehicle dealers seek to notify prospective consumers of information relating to pre-owned vehicles and/or new vehicles that have had aftermarket options installed. A typical buyers' guide does not include information about the installed aftermarket options. Moreover, printing high-quality decals or paper products with the information for each vehicle is a sunk cost that is not recouped by the vehicle dealer. Furthermore, conventional techniques require humans to manually verify that certain indicia has been added to decals and/or images hosted on a website before remitting reimbursements.

BRIEF DESCRIPTION OF THE DRAWINGS

Corresponding reference characters indicate corresponding parts throughout the drawings.

DETAILED DESCRIPTION

Figure 1:
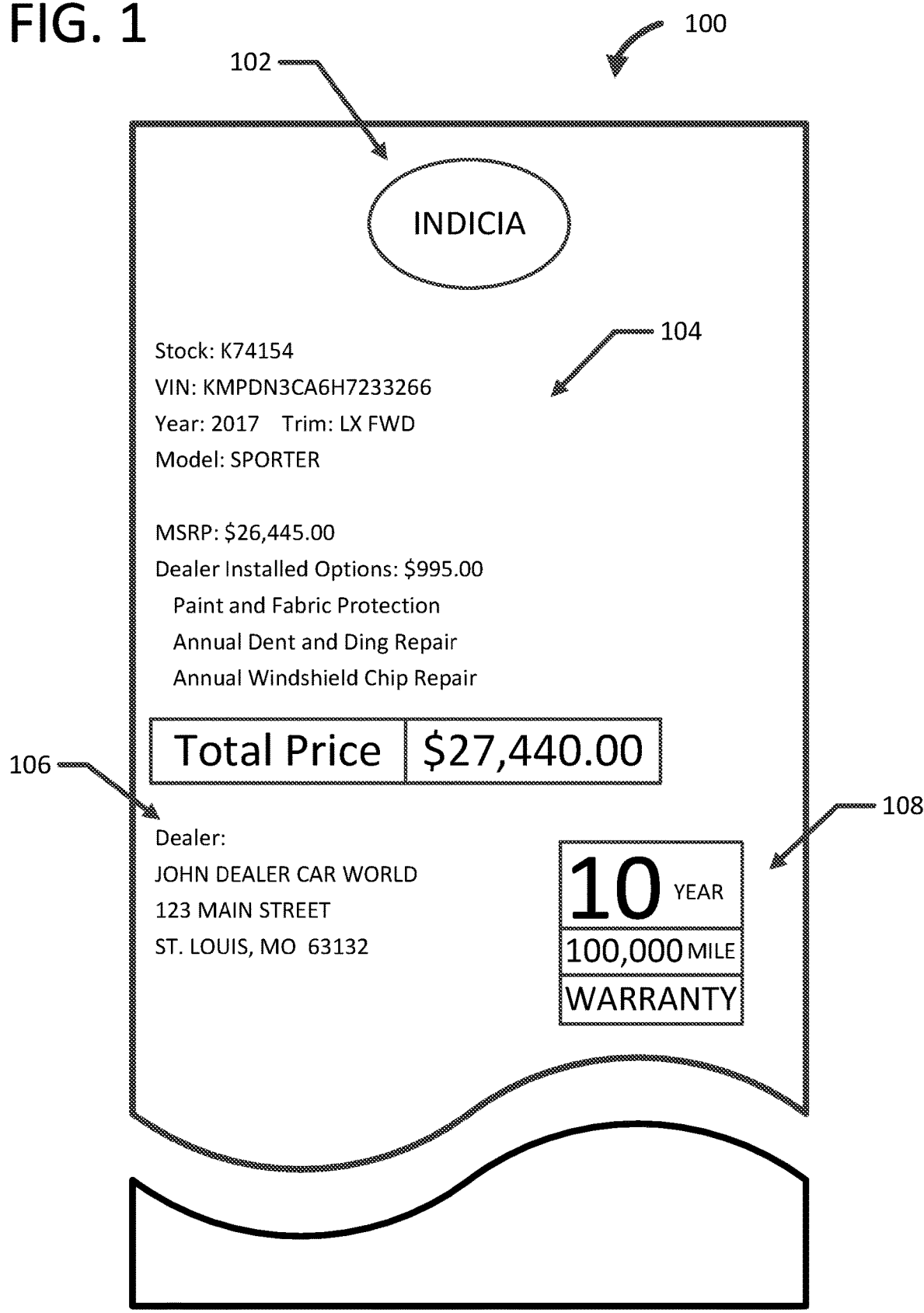
FIG. 1 illustrates an exemplary vehicle banner.

FIG. 1 illustrates a vehicle banner, generally indicated at 100, according to an embodiment of the invention. The banner 100 includes manufacturer indicia 102, vehicle information 104, dealer information 106, and advertising 108. In an embodiment, the inclusion of manufacturer indicia 102 and/or selected advertising 108 qualifies for reimbursement of the manufacturing costs of vehicle banner 100 via a cooperative advertising, or dealer marketing allowance, arrangement between the manufacturer and the dealer. For instance, a third-party printing entity may manufacture vehicle banner 100, supply the banner 100 to the vehicle dealer, and obtain a rebate from cooperative advertising funds made available by the vehicle manufacturer.

In an embodiment, manufacturer indicia 102 is a manufacturer logo. Additionally or alternatively, manufacturer indicia 102 may be any indicia identifying the vehicle manufacturer. In an embodiment, vehicle information 104 includes a stock number, a vehicle identification number (VIN), year of manufacture, trim, model, manufacturer's suggested retail price (MSRP), aftermarket options, and the like. In the embodiment illustrated in FIG. 1, dealer information 106 includes dealer name and address. Additionally or alternatively, dealer information 106 may include a dealer logo and/or other indicia identifying the vehicle dealer.

In the embodiment illustrated in FIG. 1, the advertising 108 is a warranty advertisement associated with the manufacturer. According to an aspect of the invention, advertising 108 includes a third-party advertisement, with the proceeds for displaying the additional advertising going to the vehicle dealer and/or an entity responsible for printing banner 100.

In an embodiment, vehicle banner 100 has dimensions of 4.5 inches horizontal by 11 inches vertical but it is to be understood that the banner may have different dimensions without deviating from the scope of the invention. In one embodiment, vehicle banner 100 is comprised of paper, plastic, vinyl, and the like. In an embodiment, vehicle banner 100 is a vinyl addendum disclosed in U.S. Provisional Patent Application Ser. No. 61/920,576 and U.S. patent application Ser. No. 14/575,260, incorporated herein by reference above. In an embodiment, vehicle banner 100 includes an adhesive backing to enable the banner 100 to be applied to external portions (e.g., a window, etc.) of a vehicle.

Figure 2:
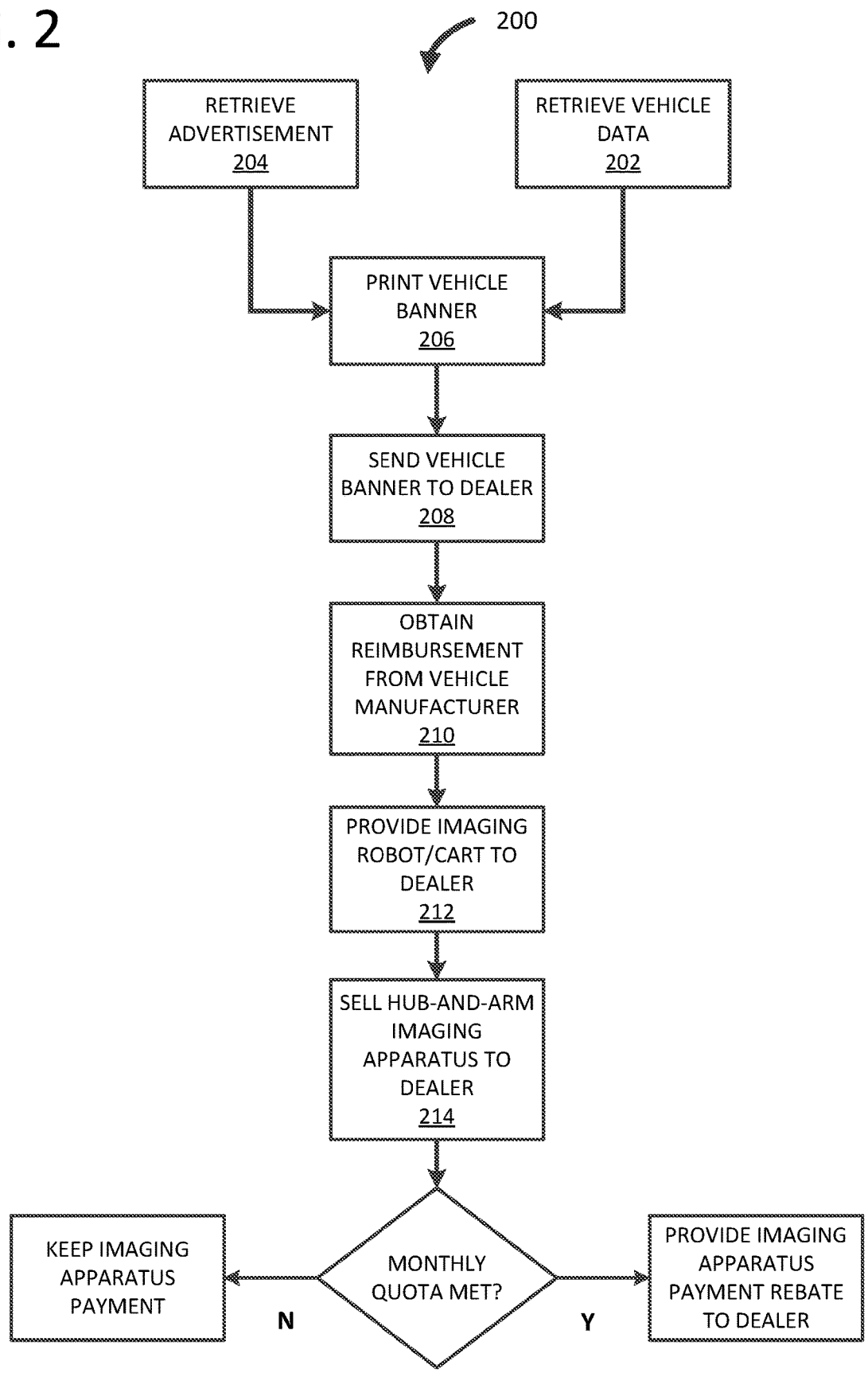
FIG. 2 is a flowchart of a method utilizing the vehicle banner of FIG. 1.

FIG. 2 illustrates a method, generally indicated at 200, of utilizing vehicle banner 100 within a cooperative advertising arrangement between the vehicle manufacturer and the vehicle dealer. A vehicle imaging provider retrieves 202 data representative of information about the vehicle. For example, the information may be included on an invoice created when the vehicle dealer obtains the vehicle (e.g., from the manufacturer, a wholesaler, at auction, etc.). In an embodiment, a computing device of the vehicle imaging provider retrieves the vehicle data from a database via a telecommunications network. Additionally or alternatively, the vehicle imaging provider retrieves 204 an advertisement to be included on vehicle banner 100. In one embodiment, the advertisement is provided by the vehicle manufacturer. In another embodiment, the advertisement is provided by a third party, such as a business within the geographic vicinity of the vehicle dealer. When the advertisement is provided by a third party, the third party provides payment to the vehicle dealer and/or the vehicle imaging provider, in an embodiment.

The vehicle imaging provider then prints 206 the vehicle banner 100, including manufacturer indicia 102, vehicle information 104, dealer information 106, and/or advertising 108. After printing vehicle banner 100, the vehicle imaging provider sends 208 (e.g., via postal services, hand delivery, etc.) banner 100 to the vehicle dealer so that banner 100 can be applied (e.g., via an adhesive backing of the banner 100, etc.) to an associated vehicle. After sending banner 100 to the dealer, the vehicle imaging provider obtains 210 a reimbursement for the cost of manufacturing banner 100 from the vehicle manufacturer based on the requirements of the cooperative advertising arrangement. In an embodiment, the vehicle imaging provider obtains a rebate from cooperative advertising funds made available by the vehicle manufacturer. The reimbursement may be obtained via electronic funds transfer, receipt of a check, an account credit, and the like.

The vehicle imaging provider then provides 212 a portable camera system, such as an imaging robot/cart, for obtaining images of the interior of the vehicle that may then be added to an entry for the vehicle in a database within a computerized exchange network. An exemplary communication network environment is described in U.S. patent application Ser. No. 14/575,260, incorporated herein by reference above. In an embodiment, the acquired images are stitched together to form a continuous image that accurately depicts a 360-degree view of the interior of the vehicle, as described in U.S. patent application Ser. Nos. 14/088,939, 14/575,260, 14/574,638, and 15/012,033, incorporated herein by reference above. In one embodiment, the vehicle imaging provider uses the imaging robot/cart to obtain the images and provides them to the vehicle dealer (e.g., free or at-cost) and/or hosts them on a computerized exchange network provided by the vehicle imaging provider. In another embodiment, the vehicle imaging provider leases or sells the imaging robot/cart to the vehicle dealer. In yet another embodiment, the vehicle imaging provider provides the imaging robot/cart to the vehicle dealer at no cost to the dealer. Information for linking images within the computerized exchange network to a specific vehicle can be printed on the vehicle banner 100 in the form of a two-dimensional code (e.g., linear barcode, QR code).

In an embodiment, the vehicle imaging provider also sells 214 an imaging apparatus to the vehicle dealer for obtaining images of the exterior of the vehicle that may then be added to the entry for the vehicle in the database within the computerized exchange network. An exemplary imaging apparatus is disclosed in U.S. patent application Ser. No. 15/012,033, incorporated herein by reference above. In an embodiment, the vehicle imaging provider charges the vehicle dealer for each vehicle that is imaged with the imaging apparatus. Additionally, the vehicle imaging provider may provide a rebate of the imaging apparatus purchase price to the vehicle dealer. For instance, when the number of vehicles imaged by the vehicle dealer with the imaging apparatus meets or exceeds a threshold value within a predetermined time period, such as 150 vehicles per month for example, the vehicle imaging provider rebates that month's payment back to the vehicle dealer. In this manner, as long as the vehicle dealer images enough vehicles with the imaging apparatus, the vehicle dealer can obtain the imaging apparatus at no cost to the dealer.

As will be understood by one of ordinary skill in the art, the method described herein enables the vehicle dealer to obtain a vehicle banner, interior images of the vehicle, exterior images of the vehicle, and/or an imaging apparatus at no-cost to the dealer.

Figure 3:
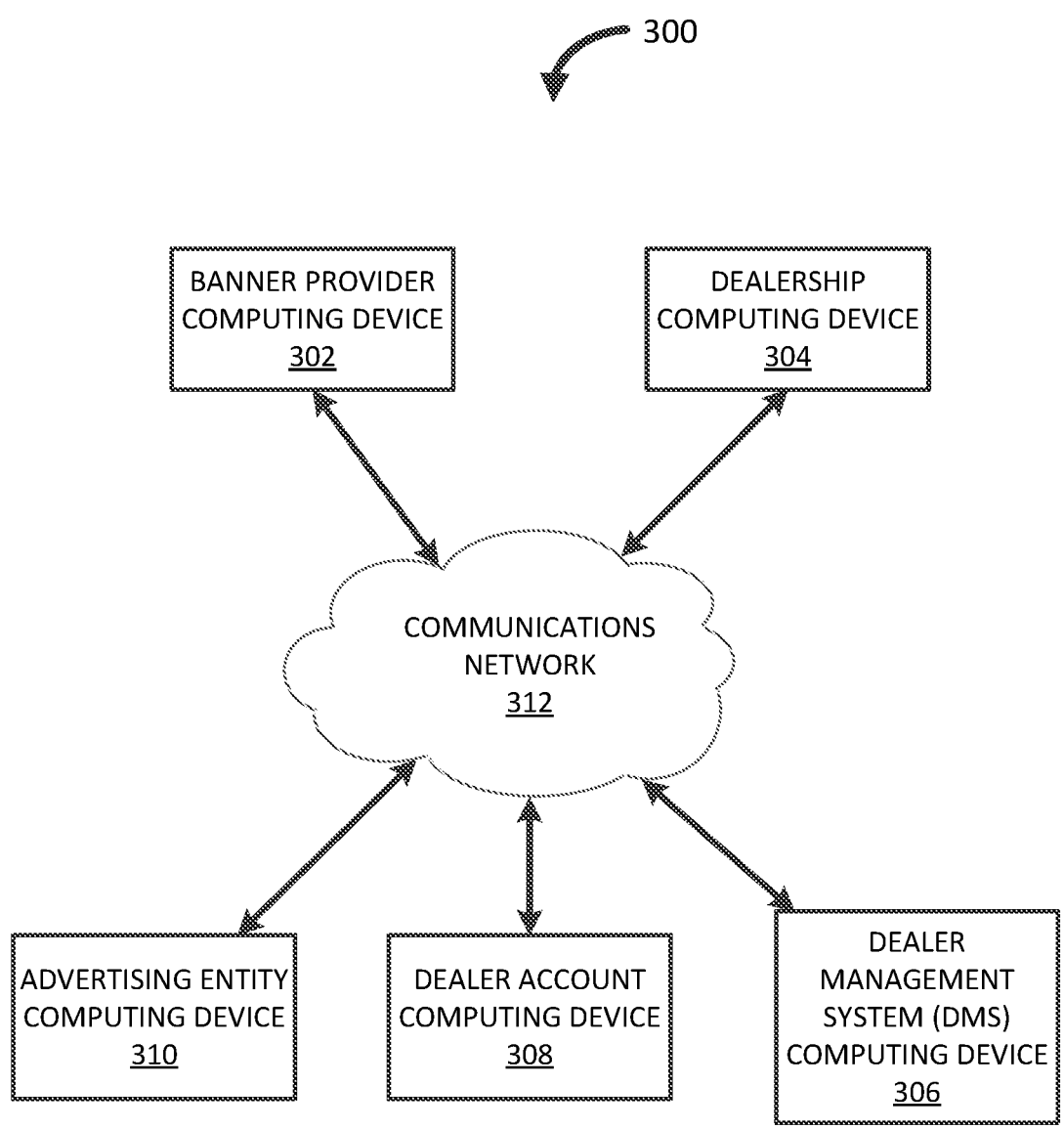
FIG. 3 illustrates an exemplary automated banner system according to an embodiment.

FIG. 3 illustrates an exemplary system, generally indicated at 300, in accordance with an aspect of the invention that includes a banner provider computing device 302, a dealership computing device 304, a dealer management system (DMS) computing device 306, a dealer account computing device 308, and an advertising entity computing device 310 that are each communicatively coupled via a communications network 312. Exemplary computing devices include, but are not limited to, personal computers (PCs), desktop computers, laptop computers, tablet computing devices, smartphones, one or more server computers, and the like, and/or combinations thereof. In an embodiment, at least banner provider computing device 302, dealership computing device 304, and/or DMS computing device 306 comprises, at least in part, an administrator console portal, as described in U.S. patent application Ser. Nos. 14/088,939, 14/574,638, 14/575,260, and 15/012,033, incorporated herein by reference above.

The communications network 312 is capable of facilitating the exchange of data among the computing devices that comprise the exemplary system 300. The communications network 312 in the embodiment of FIG. 3 includes a local area network (LAN) that is connectable to other telecommunications networks, including other LANs or portions of the Internet or an intranet. The communications network 312 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications network 312 is any medium that allows data to be physically transferred through serial or parallel communication channels (e.g., copper wire, optical fiber, computer bus, wireless communication channel, etc.). In an embodiment, communications network 312 comprises at least in part an automated vehicle banner system.

Figure 4:
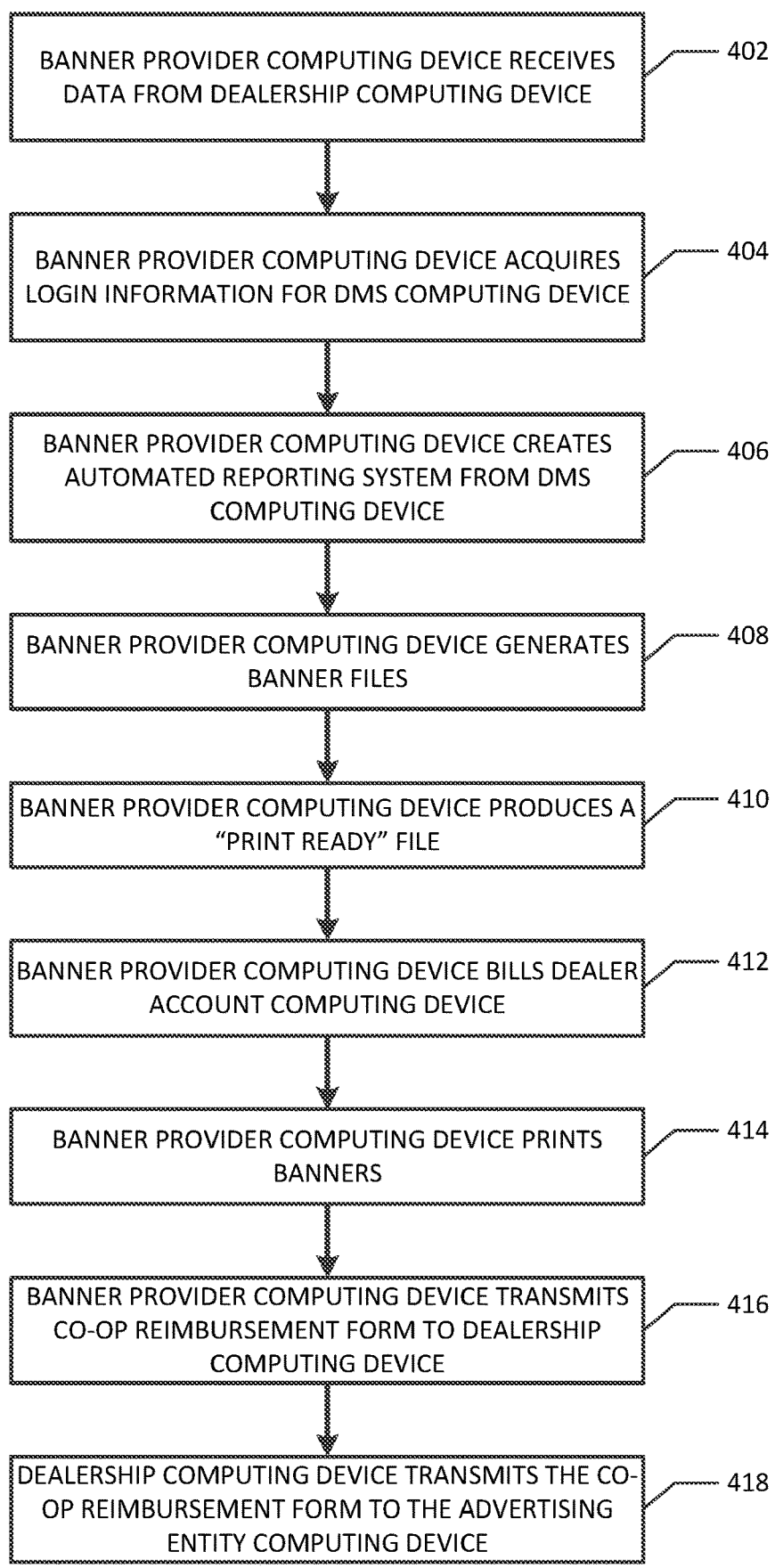
FIG. 4 is a flowchart of an exemplary automated banner generation method utilizing the system of FIG. 3 according to an embodiment.

FIG. 4 illustrates an automated vehicle banner process performed by system 300 in an embodiment. The banner provider computing device 302 receives 402 data from the dealership computing device 304 via communications network 312. In an embodiment, the received data is representative of a list of dealer-installed options and an "added value MRSP markup price" for a particular vehicle.

The banner provider computing device 302 then acquires 404, via communications network 312, login information for the dealership in the DMS computing device 306. An exemplary DMS includes, but is not limited to, DealerTrack.

The banner provider computing device 302 creates 406 an automated reporting system from data stored on the DMS computing device 306. In an embodiment, the automated reporting system on DMS computing device 306 transmits, via communications network 312, a daily report of all vehicles newly added to the dealer's inventory each day to banner provider computing device 302. In an embodiment, the report includes the stock number, VIN number, year of manufacture, trim, model, MSRP, total price, and the like for each newly added vehicle.

From the information in the received report, the banner provider computing device 302 generates 408 a banner file for each vehicle. In an embodiment, the banner files are generated by auto-filling blank fields on a banner template. For example, the banner provider computing device 302 auto-fills a total price field by automatically adding the added value markup price to the MSRP.

The banner provider computing device 302 batches together a plurality of banner files and produces 410 a "print ready" file that will enable a printing device coupled to the banner computing device 302 to print the vehicle banners (e.g., banner 100, etc.). Once the "print ready" file is produced, banner provider computing device 302 bills 412 the dealer account computing device 308. For example, banner provider computing device 302 may bill a credit card issued to the dealership that is reconciled on dealer account computing device 308. But one of ordinary skill in the art will understand that other accounts, such as debit card accounts, charge card accounts, stored-value card accounts, fleet card accounts, checking accounts, deposit accounts, and the like are within the scope of the present invention.

The banners are then, at 414, printed, cut, packaged, and shipped straight to the dealer to be processed for application to the corresponding vehicles. For example, an office administrator at the dealer receives the banners and places them in a vehicle file while awaiting arrival of the vehicle. Once the vehicle arrives at the dealership, the office administrator gives the vehicle file to a service technician, who then installs each banner on the corresponding vehicle. The banner provider computing device 302 then transmits 416 a co-op reimbursement form to the dealership computing device 304 via communication network 312. The dealership computing device 304 then transmits 418 the co-op reimbursement form to the advertising entity computing device 310 via communications network 312 for reimbursement from the vehicle manufacturer. In an embodiment, the transmission of the reimbursement form enables the advertising entity computing device 310 to verify that banner provider computing device 302 printed 414 the banners and provided them to the dealer.

Figure 5:
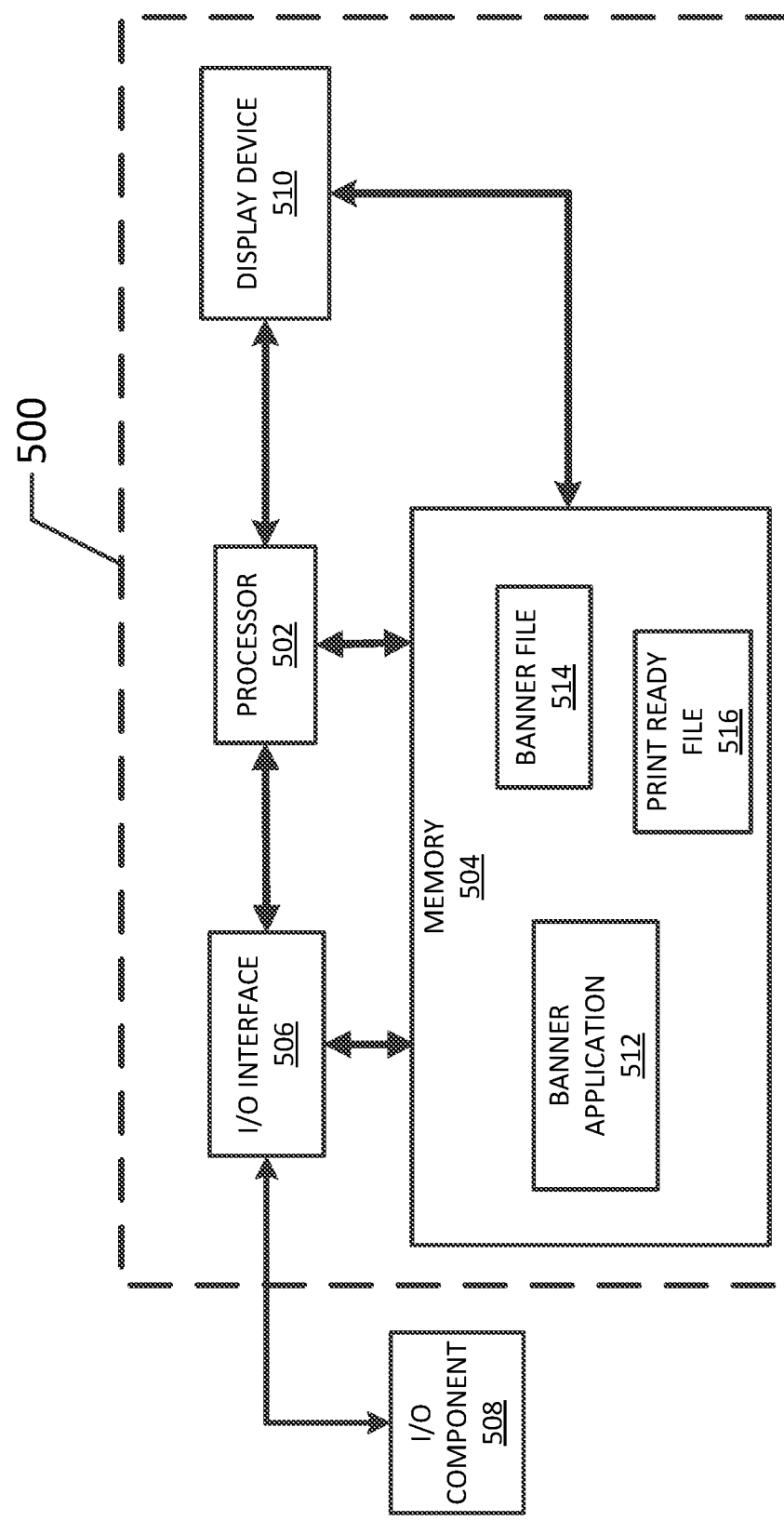
FIGS. 5 and 6 are block diagrams of exemplary computing device architectures within which aspects of the disclosure are implemented according to an embodiment.

FIG. 5 illustrates an exemplary architecture of a computing device 500 (e.g., mobile computing device, tablet computing device, desktop computing device, smartphone, etc.) programmed to provide aspects of the systems and processes described herein via a software environment. For example, the computing device 500 corresponds to banner provider computing device 302 in accordance with one or more embodiments of the invention. In the embodiment of FIG. 5, the computing device 500 includes a processor 502, a memory 504, an input/output (I/O) interface 506 that interfaces with an I/O component 508, and a display device 510. The memory 504 includes (e.g., stores processor-executable instructions comprising) a banner application 512, banner file 514 for each banner, and print ready file 516 embodied in processor-executable instructions for executing by processor 502. In this manner, the computing device 500 comprises a special-purpose computing device for automated generation of vehicle banners in accordance with an aspect of the disclosure.

The processor 502, memory 504, I/O interface 506, and display device 510 are communicatively connected and/or electrically connected to each other. The I/O interface 506 is communicatively and/or electrically connected to the I/O component 508. The processor 502 is adapted to execute processor-executable instructions stored in the memory 504 for receiving data from dealership computing device 304, acquiring login information for DMS computing device 306, creating automated reporting systems, generating banner files 514, producing print ready files 516, billing dealer account computing device 308, printing banners 100, and transmitting co-op reimbursement forms to dealership computing device 304. The I/O interface 506 of FIG. 5 provides a physical data connection between the computing device 500 and I/O component 508. In an embodiment, I/O interface 506 is a network interface card (NIC) or modem and I/O component 508 is a telecommunications network (e.g., communications network 312). Additionally or alternatively, I/O component 508 is a printing device configured to print vehicle banners 100, for example. In another embodiment, display device 510 is a touchscreen of a smartphone, tablet computing device, or the like.

Figure 6:
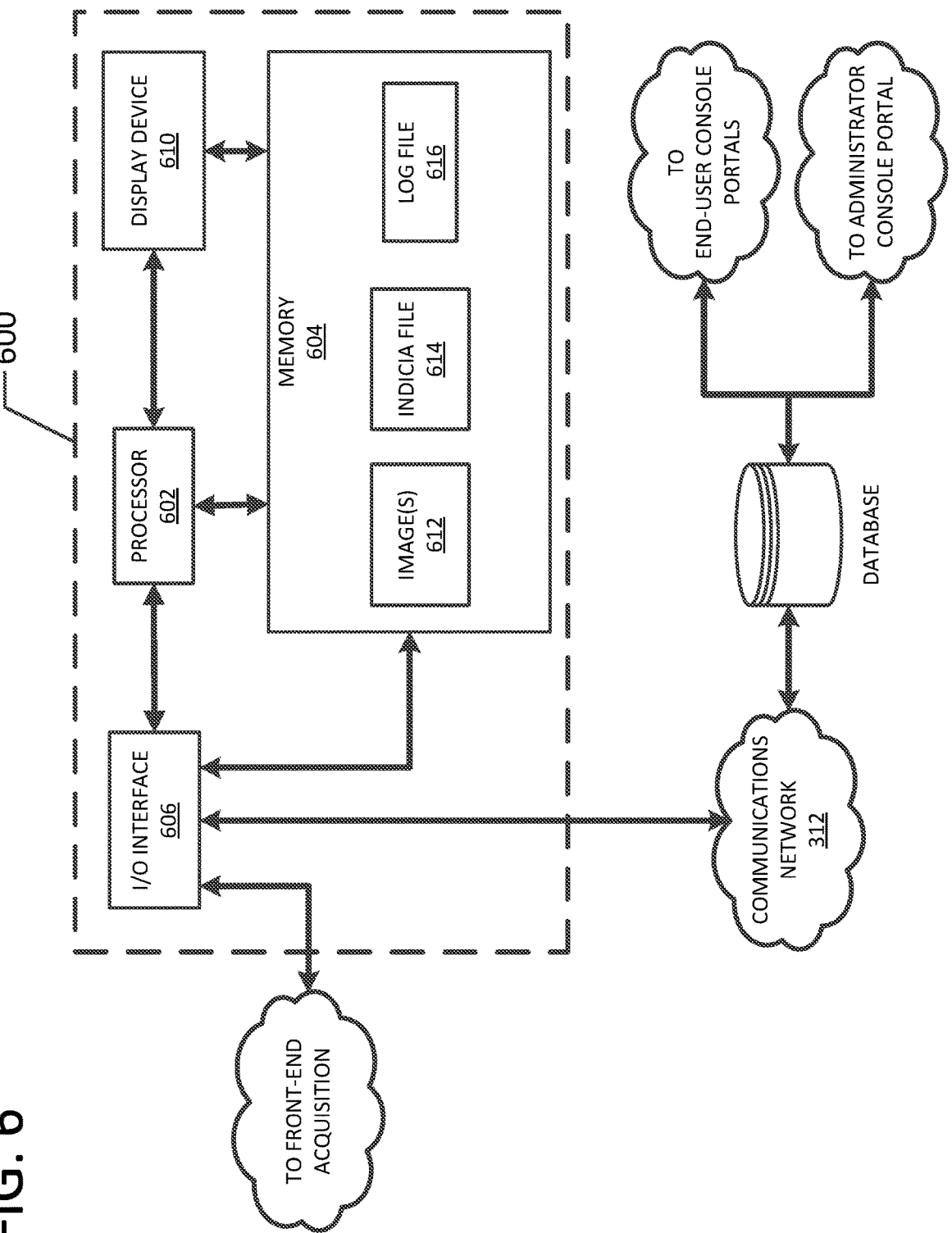

FIG. 6 illustrates an exemplary architecture of a computing device 600 (e.g., mobile computing device, tablet computing device, desktop computing device, smartphone, etc.) programmed to provide aspects of the systems and processes described herein via a software environment. For example, the computing device 600 corresponds to banner provider computing device 302 and/or dealership computing device 304 in accordance with one or more embodiments of the invention. Additionally or alternatively, computing device 600 comprises a server computing device, such as those described in U.S. patent application Ser. Nos. 14/088,939, 14/575,260, and 14/574,638, incorporated herein by reference above. In the embodiment of FIG. 6, the computing device 600 includes a processor 602, a memory 604, an input/output (I/O) interface 606, and a display device 610. The memory 604 includes (e.g., stores processor-executable instructions comprising) images 612, indicia file 614, and log file 616 embodied in processor-executable instructions for executing by processor 602. In this manner, the computing device 600 comprises a special-purpose computing device for automated alteration of vehicle images (e.g., to include digital branding, etc.) in accordance with an aspect of the disclosure.

In an embodiment, I/O interface 606 is configured to interface computing device 600 with front-end acquisition components (e.g., cameras, etc.) that are adapted for acquiring images of an object of interest. Exemplary front-end acquisition components include those described in U.S. patent application Ser. Nos. 14/575,260 and 14/574,638, incorporated herein by reference above. As used herein, images include still photographs (e.g., snap shots), moving photographs (e.g., videos or movies), panoramas, stereoscopic photographs, infrared images, or any combination thereof. In addition to acquiring images of an entire object, images of only a portion of an object may be acquired.

The I/O interface 606 is further configured to interface computing device 600 with communications network 312. In an embodiment, computing device 600 is communicatively coupled to a computing device hosting a database via at least I/O interface 606 and communications network 312. The database in this exemplary embodiment stores the acquired images along with metadata or other corresponding information relating to the images and/or the objects themselves. For example, the database stores information corresponding to imaged vehicles including, by way of example and not limitation, vehicle stock number, VIN number, vehicle color, vehicle make, vehicle model, vehicle type, objective vehicle condition information, and the like. In one embodiment, the information contained in the database is used with a website template stored on computing device 600 or an external server for showcasing the objects to consumers via a virtual showroom. The database is capable of using various standards, such as SQL, ODBC, and JDBC, for example. Exemplary database management systems (DBMS) include MySQL, Microsoft SQL Server, Oracle, and SAP. The database and the information it contains is accessible via the Internet, such as through the use of a web browser or an API. In an exemplary embodiment, the database is accessible to end-user console portals and/or an administrator console portal, as disclosed in U.S. patent application Ser. Nos. 14/088,939, 14/575,260, and 14/574,638, incorporated herein by reference above. Further embodiments of the database are disclosed in U.S. patent application Ser. Nos. 14/088,939, 14/575,260, and 14/574,638, incorporated herein by reference above.

Figure 7:
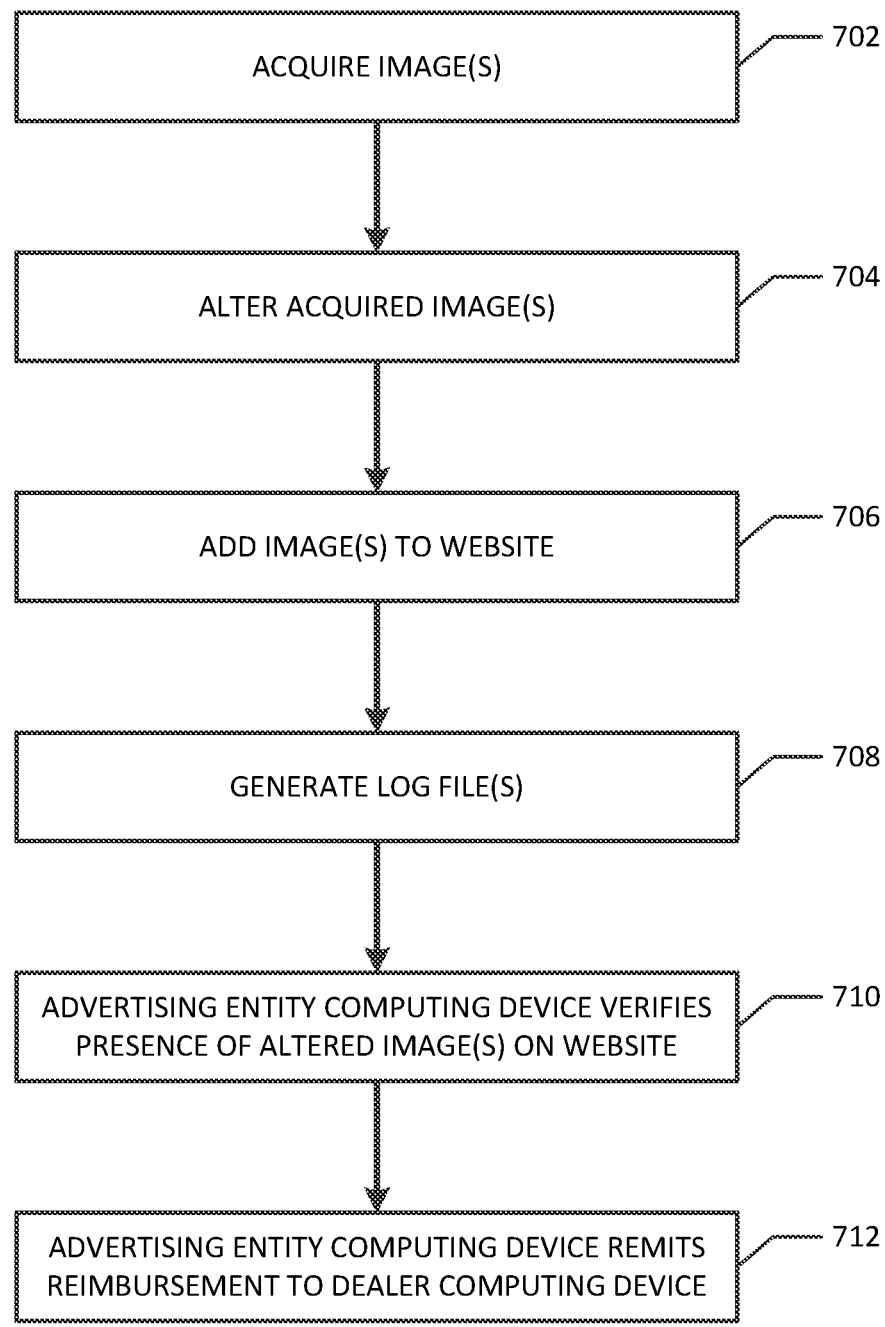
FIG. 7 is a flowchart of an exemplary automated vehicle image alteration and verification method utilizing the system of FIG. 3 according to an embodiment.

FIG. 7 illustrates an exemplary embodiment of an automated vehicle image alteration and verification process performed by system 300 in which computing device 600 comprises dealership computing device 304. In accordance with an aspect of the disclosure, the process of FIG. 7 enables automatic verification that certain indicia (e.g., digital branding, etc.) occurred and automatic initiation of reimbursements. The computing device 600 acquires 702 one or more images (e.g., images 612) of an object of interest (e.g., vehicle, etc.), such as via front-end acquisition components, for example.

Upon acquiring the images, computing device 600 alters 704 the acquired images. In an embodiment, the image altering comprises adding and/or otherwise modifying the image to include one or more indicia (e.g., manufacturer indicia 102, vehicle information 104, dealer information 106, advertising 108, branding elements, etc.). In an aspect, the indicia is represented by indicia file 614. As described in U.S. patent application Ser. No. 14/088,939, incorporated herein by reference above, the image altering includes superimposing the acquired images on a stock photograph, such as a photograph of a dealership building, in an exemplary embodiment, or simply a uniform background to remove extraneous objects from the background thus simulating the image was taken in a studio. One of ordinary skill in the art will understand that other additions and/or modifications are within the scope of the present disclosure. In an embodiment, the image altering includes adding indicia (e.g., logo, motto, trademark, etc.) to the background of an acquired image. In this manner, the indicia is visible but does not interfere with the view of the object of interest.

According to aspects of the invention, the inclusion of indicia (e.g., manufacturer indicia 102, selected advertising 108, etc.) qualifies for reimbursement of the acquisition and hosting costs of the acquired images via a cooperative advertising, or dealer marketing allowance, arrangement between the manufacturer and the dealer. For instance, a third-party entity may acquire and host images of vehicles, supply the images to a website of the vehicle dealer, and qualify the dealer to obtain a rebate from cooperative advertising funds made available by the vehicle manufacturer because the images include approved promotional, marketing, and/or advertising content.

The computing device 600 adds 706 the acquired images to a website (e.g., a website of a dealer, etc.). Upon altering 704 and adding 706 the images to the website, computing device 600 generates 708 one or more log files (e.g., log files 616) that records the occurrence of the altering 704 and the adding 706. The advertising entity computing device 310 obtains the log files to verify 710 the occurrence of the altering 704 and the adding 706. In an embodiment, computing device 600 (e.g., comprising dealership computing device 304) transmits the log files to advertising entity computing device 310. In another embodiment, advertising entity computing device 310 retrieves the log files from computing device 600 (e.g., comprising dealership computing device 304). Additionally or alternatively, computing device 600 stores the log files in a database for accessing by advertising entity computing device 310. The advertising entity computing device 310 then remits 712 reimbursement to computing device 600 (e.g., comprising dealership computing device 304). In an embodiment, the reimbursement comprises a rebate from cooperative advertising funds made available by the manufacturer of the object of interest of which the images were acquired. The reimbursement is obtained via one or more of electronic funds transfer, receipt of a check, an account credit, and the like.

In an embodiment, the acquired images and data are stored in a database that is configured to be mined for patterns, analogous values, and the like. In an exemplary embodiment, computing devices implementing machine learning algorithms and/or other data analysis techniques (e.g., image processing, pattern recognition, natural language processing, artificial intelligence, etc.) analyze the images and/or data stored in the database.

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links)

through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for verifying image alterations, comprising:
a front-end image acquisition device for acquiring one or more images of each of a plurality of vehicles available from a dealer;
a dealer computing device, comprising:
an acquisition and alteration processor, and
a computer-readable storage device storing processor-executable instructions and an indicia file, wherein the instructions, when executed by the acquisition and alteration processor, configure the dealer computing device to:
acquire the images of the plurality of vehicles via the front-end image acquisition device,
superimpose an indicia from the indicia file on a background of at least one of the acquired images to be altered,
mask one or more objects from the background of the at least one of the acquired images to be altered, wherein the one or more objects from the background are other than the vehicle and the superimposed indicia,
generate an altered image from the at least one of the acquired images to be altered including the superimposed indicia and having the one or more objects masked from the background, whereby the indicia is visible without blocking the view of the vehicle in the altered image,
add the altered image to a website,
generate a log file in response to said altering and said adding, the log file recording each occurrence of altering the at least one of the acquired images and adding the altered image to the website, and
transmit the generated log file to an advertising entity computing device to enable the advertising entity computing device to verify said adding the altered images to the website and remit cooperative advertising funds to the dealer computing device in response thereto.

2. The system of claim 1, wherein the indicia comprises digital branding.

3. A method for verifying image alterations, comprising:
acquiring, by a dealer computing device via a front-end image acquisition device, one or more images of a vehicle;
altering, by the dealer computing device, at least one of the acquired images, wherein altering comprises superimposing an indicia from an indicia file on a background of the acquired image to be altered and masking objects from the background thereof other than the vehicle and the superimposed indicia to generate an altered image, wherein the superimposed indicia is visible in the altered image on the background thereof without blocking the view of the vehicle in the altered image;
transmitting, by the dealer computing device, the altered image to a server computing device, the server computing device hosting a website via which the altered image is available via the Internet;
recording occurrences of altering the at least one of the acquired images and transmitting the altered image to the server;
generating, by the dealer computing device, a log file of the recorded occurrences in response to said altering and said transmitting;
transmitting, by the dealer computing device, the log file to an advertising entity computing device; and
remitting, by the advertising entity computing device, cooperative advertising funds to the dealer computing device based on the transmitted log file.

4. The method of claim 3, further comprising:
verifying, by the advertising entity computing device, said altering the at least one of the acquired images and said transmitting the altered image; and
wherein the remitting, by the advertising entity computing device, is responsive to successful verification of said altering and said transmitting the altered images.

5. The method of claim 3, wherein the indicia comprises digital branding.

6. A system for verifying vehicle banner production for a vehicle, comprising:
a printing device; and
a banner provider computing device, wherein the banner provider computing device is communicatively coupled to the printing device, the banner provider computing device comprising:
a processor, and
a computer-readable storage device storing processor-executable instructions and an indicia file, wherein the instructions, when executed by the processor, configure the banner provider computing device to:
receive data from a dealer computing device, wherein the received data comprises dealer-installed options and added value markup for the vehicle,
generate a banner file for the vehicle by auto-filling blank fields on a banner template with the received data,
produce a print ready file of the banner files, wherein the print ready file includes an image of the vehicle altered by masking objects from a background thereof, and wherein the print ready file enables the printing device to print a vehicle banner for the vehicle indicative of the dealer-installed options and added value markup and including the altered image of the vehicle,
transmit the print ready file to the printing device, wherein the printing device prints the vehicle banner for display on the vehicle in response to receiving the print ready file from the banner provider computing device, and
transmit a co-op reimbursement form to the dealer computing device in response to the printing of the vehicle banner for use in verifying the printing of the vehicle banner;
wherein the transmission of the co-op reimbursement form from the dealer computing device to an advertising entity computing device enables the advertising entity computing device to verify the printing of the vehicle banner and remit cooperative advertising funds to the dealer computing device in response thereto.

* * * * *